United States Patent
Badenoch et al.

(10) Patent No.: US 6,219,602 B1
(45) Date of Patent: Apr. 17, 2001

(54) VEHICLE SUSPENSION CONTROL WITH STABILITY IN TURN ENHANCEMENT

(75) Inventors: Scott Wilson Badenoch, Farmington Hills, MI (US); David Andrew Shal, Bellbrook, OH (US); Albert Victor Fratini, Jr., Evanston, IL (US); Karen Marie Connair, Kettering, OH (US); Eldon Gerrald Leaphart, Southfield, MI (US); Raymond Kurt Schubert, Mountain View, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/535,702

(22) Filed: Mar. 27, 2000

Related U.S. Application Data

(63) Continuation-in-part of application No. 09/283,789, filed on Apr. 1, 1999, now abandoned.

(51) Int. Cl.$^7$ .................................................. B60G 17/00
(52) U.S. Cl. .............................. 701/37; 701/48; 701/91; 280/5.5; 280/5.512; 280/5.515; 180/41
(58) Field of Search ................................ 701/37, 38, 48, 701/73, 91; 280/5.5, 5.502, 5.506, 5.507, 5.512, 5.515; 180/41, 197

(56) References Cited

U.S. PATENT DOCUMENTS

| | | | |
|---|---|---|---|
| 4,869,528 | 9/1989 | Buma et al. | 280/707 |
| 5,517,414 | 5/1996 | Hrovat | 364/424.05 |
| 5,572,425 | * 11/1996 | Levitt et al. | 701/37 |
| 5,606,503 | * 2/1997 | Shal et al. | 701/1 |
| 5,911,768 | * 6/1999 | Sasaki | 701/38 |

FOREIGN PATENT DOCUMENTS

| | | |
|---|---|---|
| 0417792 | 3/1991 | (EP) . |
| 0539063 | 4/1993 | (EP) . |
| 0607516 | 7/1994 | (EP) . |
| 0734890 | 2/1996 | (EP) . |
| 0963867 | 12/1999 | (EP) . |
| 05169957 | 9/1993 | (JP) . |
| 11020444 | 1/1999 | (JP) . |

* cited by examiner

Primary Examiner—William A. Cuchlinski, Jr.
Assistant Examiner—Yonel Beaulieu
(74) Attorney, Agent, or Firm—Robert M. Sigler

(57) ABSTRACT

A vehicle suspension control includes a vehicle body control responsive to body/wheel velocity at the corners of the vehicle body to derive a demand force command for dampers at each corner of the vehicle body for vehicle body control and applies each of the derived demand force commands to its respective damper only when a comparison of the direction of the demand force command with the sensed relative velocity of the damper indicates that a force corresponding to the demand force command can be effectively exerted by the damper. But the suspension control also includes a vehicle stability control responsive to an indicated vehicle lateral acceleration in a turn to determine, independently of the vehicle body control, a stability compression damping command for the suspension dampers on the side of the vehicle opposite the direction of the lateral acceleration and a stability rebound damping command for the suspension dampers on the side of the vehicle in the direction of the lateral acceleration. While the lateral acceleration is sensed, the vehicle stability control applies the stability compression damping command to the suspension dampers on the side of the vehicle opposite the direction of the lateral acceleration and the stability rebound damping command to the suspension dampers on the side of the vehicle in the direction of the lateral acceleration, without regard for the direction of demand force for any of the suspension dampers. The resulting stiffening of the suspension on the outside of the turning vehicle in compression and on the inside of the turning vehicle during rebound helps keep the tires of the vehicle firmly in contact with the road surface in spite of road surface irregularities.

12 Claims, 8 Drawing Sheets

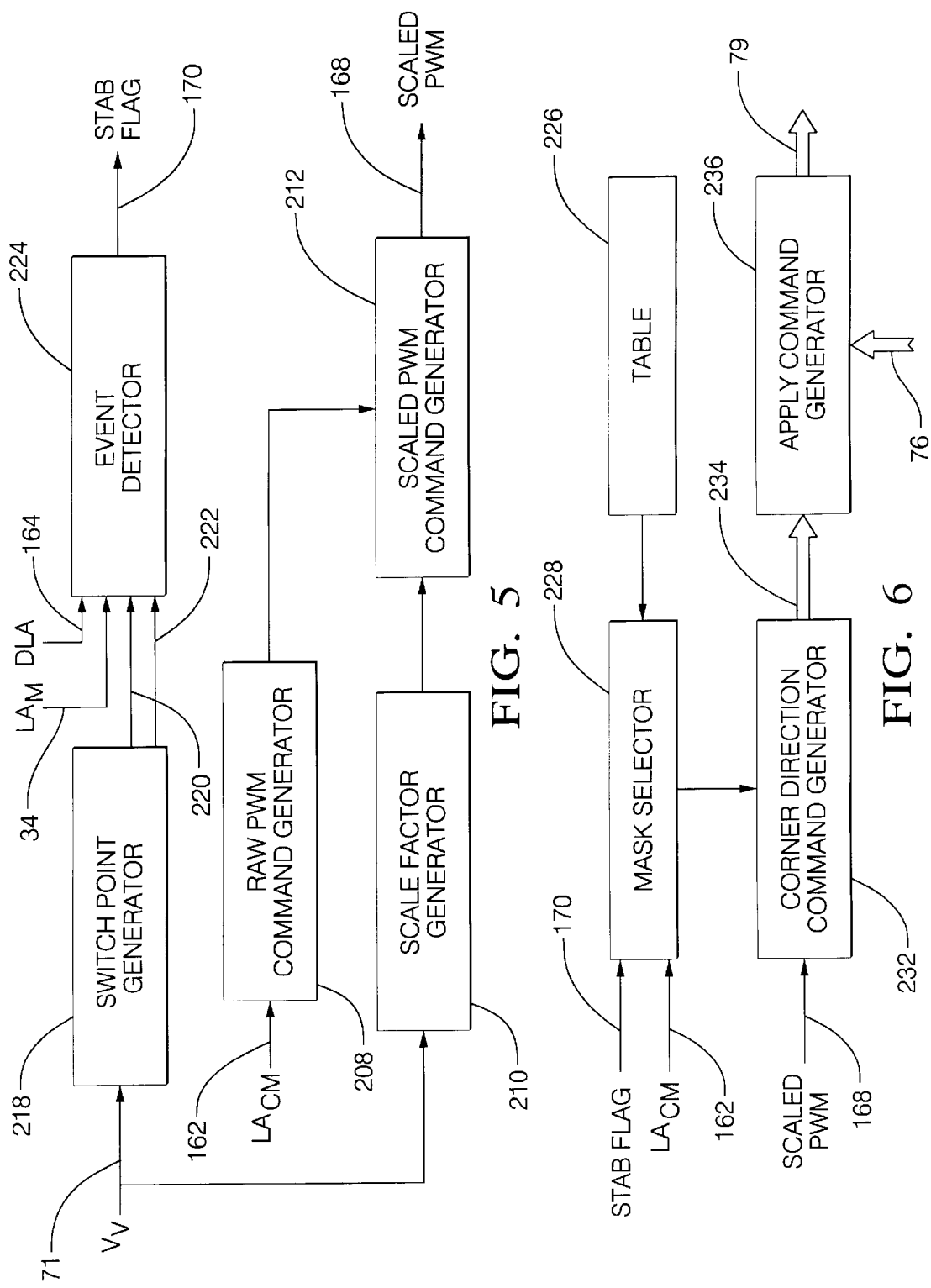

VEHICLE SUSPENSION CONTROL WITH STABILITY IN TURN ENHANCEMENT

This application is a continuation-in-part of U.S. Ser. No. 09/283,789, filed Apr. 1, 1999 now abandoned and assigned to the assignee of this application.

TECHNICAL FIELD OF THE INVENTION

The technical field of this invention is a vehicle suspension control system.

BACKGROUND OF THE INVENTION

When a motor vehicle is steered into an extended turn, the vehicle body weight tends to shift toward the outside wheels, and the best handling in the turn is obtained by maximizing the contact of the outside wheels with the road surface, which contact can be affected by road surface roughness.

Many automotive vehicles have suspensions that vary damping force in response to control commands determined by a computer controller, in order to improve overall vehicle ride comfort and handling. One such system is responsive to absolute body modal velocities derived from relative body/wheel position or velocity sensors and acts through controllable dampers to provide control of sensed body motions and reduce ride harshness. This control also provides a measure of wheel control; but it is generally designed for a balanced approach between comfort and handling.

SUMMARY OF THE INVENTION

The suspension control of this invention includes a body control responsive to relative body/wheel velocity at the corners of the vehicle body to derive a demand force command for each of the dampers for vehicle body control and, as in the prior art, applies each of the derived demand force commands to its respective damper only when a comparison of the direction of the demand force command with the sensed relative velocity of the damper indicates that a force corresponding to the demand force command can be effectively exerted by the damper. But the suspension control of this invention adds to such a body control a vehicle stability control that is responsive to indicated lateral acceleration of the vehicle in a turn to determine, independently of the vehicle body control, a stability compression damping command for the suspension dampers on the side of the vehicle opposite the direction of the lateral acceleration and a stability rebound damping command for the suspension dampers on the side of the vehicle in the direction of the lateral acceleration. While the lateral acceleration is sensed, the vehicle stability control applies the stability compression damping command to the suspension dampers on the side of the vehicle opposite the direction of the lateral acceleration and the stability rebound damping command to the suspension dampers on the side of the vehicle in the direction of the lateral acceleration, without regard for the direction of demand force for any of the suspension dampers. The resulting stiffening of the suspension on the outside of the turning vehicle in compression and on the inside of the turning vehicle during rebound helps keep the tires of the vehicle firmly in contact with the road surface in spite of road surface irregularities.

BRIEF DESCRIPTION OF THE DRAWINGS

The present invention will now be described by way of example with reference to the following figures, in which:

FIG. 5 illustrates a control during turning block for use in the vehicle stability control of FIG. 3.

FIG. 6 illustrates a turning direction corner control for use in the vehicle stability control of FIG. 3.

DETAILED DESCRIPTION OF THE INVENTION

Figure 1:
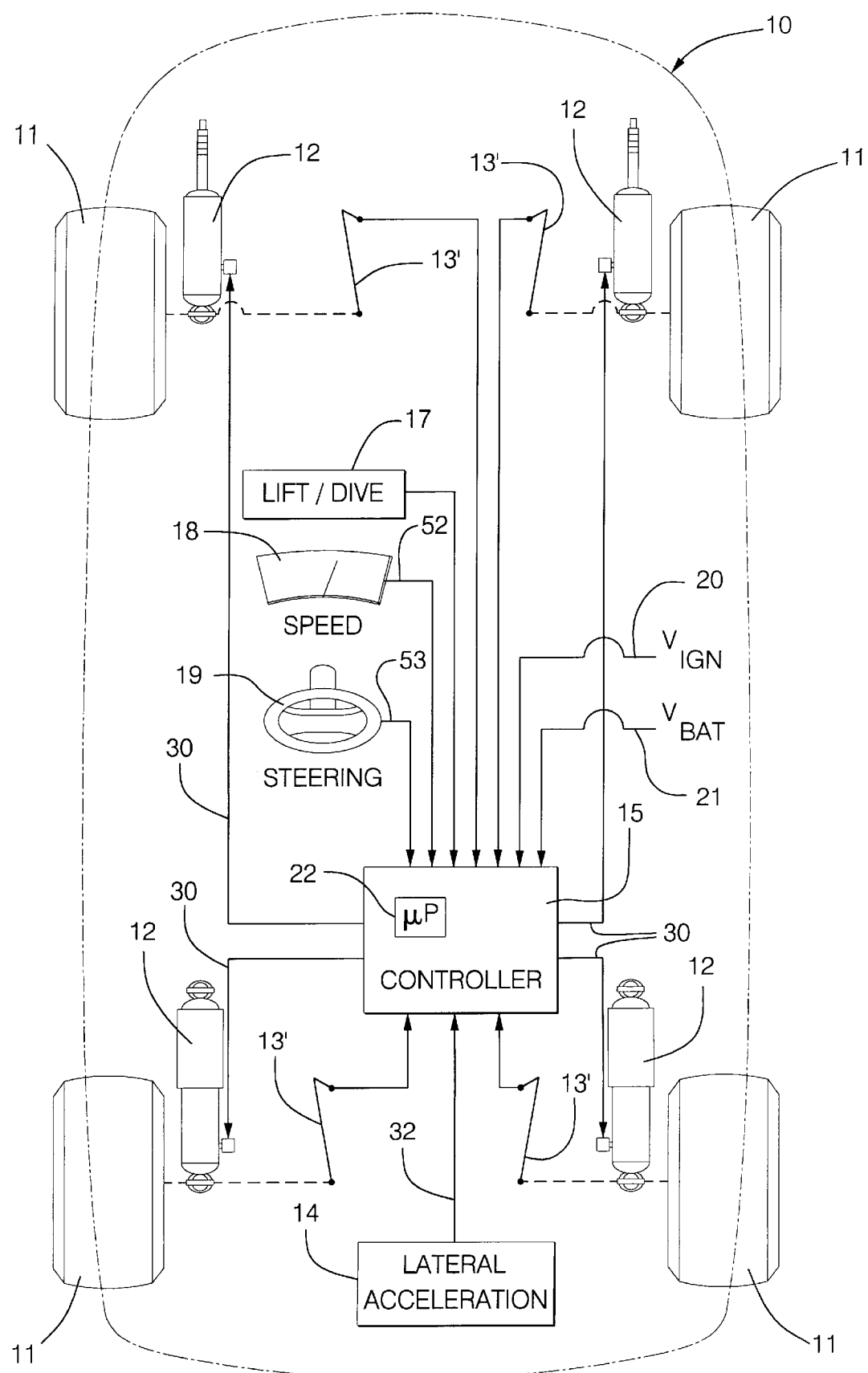
FIG. 1 illustrates a vehicle with a suspension control system according to this invention.

Referring to FIG. 1, an example apparatus implementing this invention comprises a vehicle body 10 supported on four wheels 11 by four suspensions including springs of a known type (not shown). Each suspension includes a variable-force, real time, controllable damper 12 connected to exert a vertical force between wheel 11 and body 10 at that suspension point. Although many such suspension arrangements are known and appropriate to this invention, actuator 12 of the preferred embodiment comprises an electrically controllable, variable force damper in parallel with a weight bearing coil spring in a parallel spring/shock absorber or McPherson strut arrangement. A description of a variable force damper suitable for use as actuator 12 is the continuously variable damper described in U.S. Pat. No. 5,282,645.

Each corner of the vehicle includes a position sensor 13 that provides an output signal indicative of the relative vertical distance between the vehicle wheel and the suspended vehicle body at that corner of the vehicle. The outputs of position sensors 13 may be differentiated to produce relative body-wheel vertical velocity signals for each corner of the vehicle and may be used, for example, as described in U.S. Pat. No. 5,606,503, to determine the body modal velocities of body heave velocity, body roll velocity and body pitch velocity. The relative body-wheel vertical velocity signals are an example of what is referred to herein as a set of parameters indicative of motion of a body of the vehicle and of motion of wheels of the vehicle.

An example position sensor 13 includes a resistive device mounted to the vehicle body and a link pivotally coupled between the vehicle wheel and a pivot arm on the resistive device such that the resistive device provides an impedance output that varies with the relative vertical position between wheel 11 and the corner of body 10. Each position sensor 13 may further include an internal circuit board with a buffer circuit for buffering the output signal of the resistive device and providing the buffered signal to a suspension controller 15. Suitable position sensors 13 of this are known to, or can be constructed by, those skilled in the art. Any alternative type of position sensor, including transformer type sensors, may be used as position sensors 13.

The outputs of relative position sensors 13 are provided to suspension controller 15 which processes the signals, for example as described in U.S. Pat. No. 5,606,503, to determine the states of vehicle body 10 and wheels 11 and generates an output actuator control signal for each variable actuator 12. Suspension controller 15 sends these signals through suitable output apparatus to control actuators 12 in real time. Other signals that suspension controller 15 may use include a lift/dive signal from a sensor 17, a vehicle speed signal from a sensor 18, a steering wheel angular position from a sensor 19 and a measured lateral acceleration signal from a sensor 20. Obtaining such signals may be achieved through the use of known types of sensors or vehicle control signals available to those skilled in the art.

Figure 2:
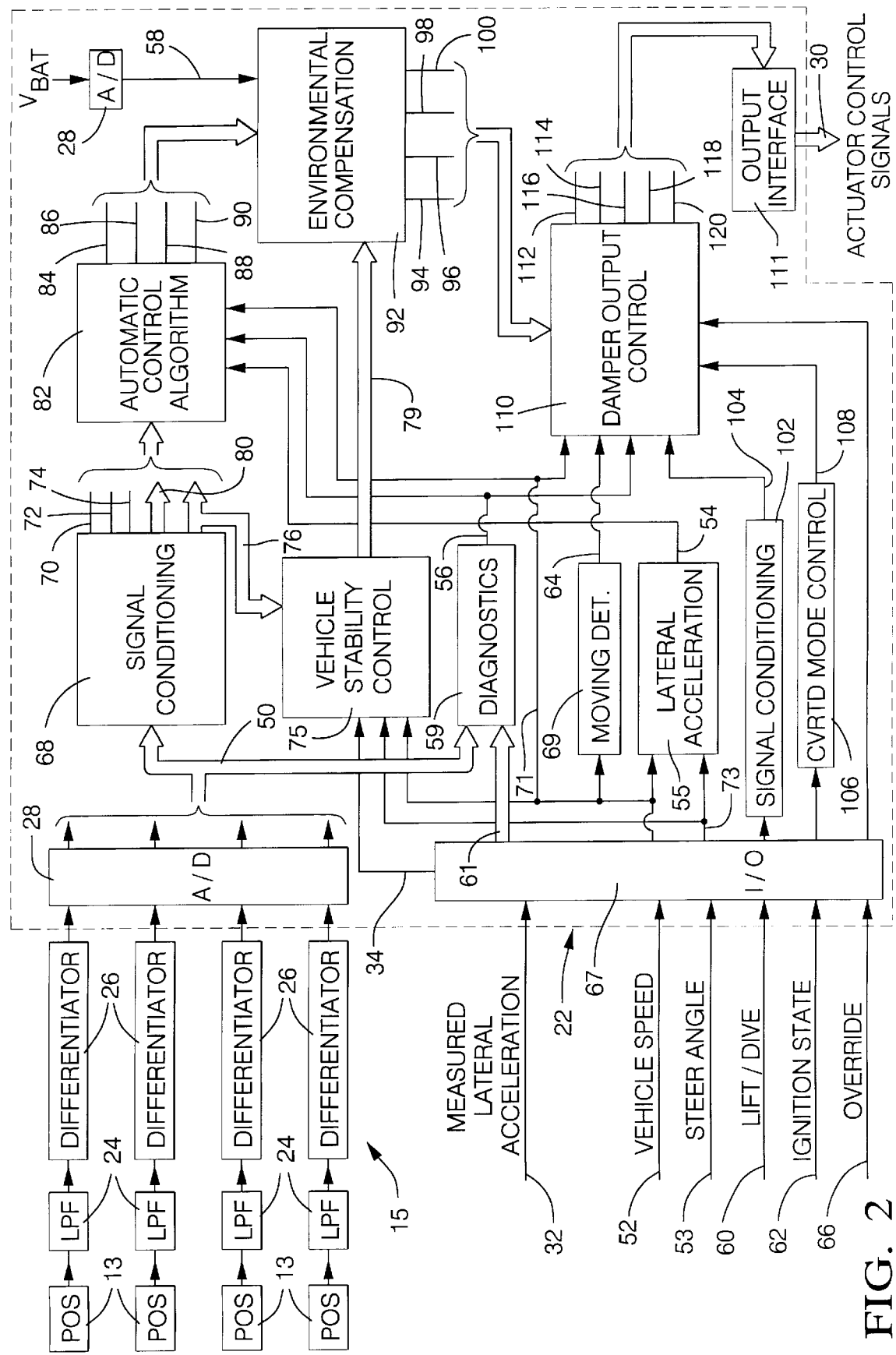
FIG. 2 is a block diagram of a suspension controller for use in the suspension control system of FIG. 1.

Suspension controller 15, shown in more detail in FIG. 2, may be a digital microcomputer 22 programmed to process a plurality of input signals in a stored algorithm and generate output control signals for actuators 12. Analog signal processing is provided for some of the input signals. For example, signals from relative position sensors 13 are low-pass filtered through four analog low-pass filters 24 and differentiated through four analog differentiators 26 to provide four relative velocity signals. An exemplary combination of such a low pass filter and differentiator is shown in U.S. Pat. No. 5,255,191, issued Oct. 19, 1993. The resulting relative velocity signals represent the relative vertical velocities between each of wheels 11 and the corresponding corner of the body. Each of these relative velocity signals is input to microcomputer 22, which includes an input A/D converter 28 with multiplexed inputs. Reference 50 represents the four corner suspension relative vertical velocities input into the microprocessor 22 through A/D converter 28. In an alternative example implementation, relative position sensors 13 are replaced with relative velocity sensors of a type known to those killed in the art capable of outputting signals indicative of the relative velocity between each wheel and corner of the vehicle body. In this alternative, there is no need for the differentiators 26.

Various other digital/discrete signals are provided to microcomputer 22 through I/O apparatus 67. Line 32 provides a measured lateral acceleration signal from sensor 20, which is a standard lateral acceleration sensor, and is output on line 34. Line 52 provides vehicle speed signal from sensor 18, which signal is preferably buffered in a known manner in block 67 to remove unwanted noise; and the buffered signal is output on line 71. This signal, which may be the same as that used for the vehicle speedometer and/or other vehicle systems, may comprise a pulse train having pulse timing varying with vehicle speed, a signal the decoding of which is well known in the art. Line 53 provides a steering angle signal to block 67 from sensor 19 and is output on line 73. This signal may be obtained from a rotational sensor in the steering gear, with a number of sensors and designs known in the art. Line 60 provides a signal that indicates when the vehicle is in a dive (front end dip) or lift (front end rise) tendency situation such as occurs during hard braking or hard acceleration of the vehicle. Lift/dive sensor 17 may be part of a powertrain controller that determines a vehicle dive tending situation if a decrease in vehicle speed over a predetermined time period is greater than a predetermined limit and determines a lift tending situation if an increase in throttle angle over a predetermined time period is greater than a predetermined threshold. The signal from lift/dive sensor 17 is generally a discrete, binary signal that has a first value when there is either a detected lift or dive, and is otherwise inactive. Line 62 provides a discrete, binary ignition state signal indicative of vehicle operation; and line 66 provides a discrete override signal useful for in-plant testing or service of the system.

A lateral acceleration calculator 55 is effective to derive a calculated vehicle lateral acceleration signal in a known manner from the vehicle speed signal on line 71 and the vehicle steering angle signal on line 73 and output the derived vehicle lateral acceleration signal on line 54. In particular, the signal may be the computed lateral acceleration derived as described in block 194 later in this description. Alternatively, the signal provided on line 54 may be the measured lateral acceleration from lateral acceleration sensor 20 or the combined lateral acceleration derived in block 196 described at a later point in this description. A diagnostic routine is responsive to various signals in I/O apparatus 67 to perform known functions such as checking for open circuits and short circuits from any of the sensors, input lines or actuators or any of the other lines (represented in general as bus 61) and is capable of generating a system failure command on an output line 56.

The digital outputs of A/D converter 28 are provided to signal conditioning block 68, in which each is digitally high-pass filtered to remove any DC offset introduced by the digitization of A/D converter 28. Block 68 derives from these filtered signals a set of relative velocity signals for the four corners on bus 76, a set of estimated average wheel velocity signals for the four wheels on bus 80 and a set of body modal (heave, pitch and roll) velocity signals on lines 70, 72 and 74, respectively for use in automatic control algorithm 82, to derive actuator control signals representing the demand force commands for each of actuators 12 and outputs these commands on lines 84, 86, 88 and 90. The demand force commands generated by automatic control algorithm 82 are preferably PWM duty cycle commands. However, actuators of another type not based on PWM control can be substituted as an alternative; and it will be recognized that variable force controls other than those with PWM control are equivalents to the PWM control example set forth herein.

The PWM duty cycle commands from automatic control algorithm 82 on lines 84, 86, 88 and 90 are provided to environmental compensation block 92. A set of four vehicle stability PWM duty cycle commands derived in accordance with this invention for the same wheels in a vehicle stability control 75 is also provided to environmental compensation block 92 on a bus 79. Environmental compensation block 92 derives a combined PWM duty cycle command for each wheel from the PWM duty cycle command from automatic control algorithm 82 and the vehicle stability PWM duty cycle command from control 75 corresponding to the same wheel. Preferably, the method of combination is to select the larger of the PWM duty cycle command from automatic control algorithm 82 and the vehicle stability PWM duty cycle command from control 75 for the same wheel. Vehicle stability control 75 will be described in detail below.

Environmental compensation block 92 then scales the four combined PWM duty cycle commands based on a scaling factor derived from the vehicle battery voltage VBAT, which is input to microcomputer 22 through an A/D converter 28. The scaled combined PWM duty cycle commands for the four wheels are then output on lines 94, 96, 98 and 100.

Damper output control 110 receives the scaled combined PWM duty cycle commands and determines when to output these signals on output lines 112, 114, 116, 118 and 120 and when to override these signals for some specific purpose. For example, damper output control 110 may be responsive to a diagnostic failure command from diagnostic block 59 to output predetermined "failure mode" PWM duty cycle commands: for example, a default PWM command that is scaled simply in response to vehicle speed. Control 110 may be responsive to the override signal from line 66 to actuate all dampers in a predetermined manner for in-plant or service testing. Control 110 may be responsive to the lift/dive signal, debounced in signal conditioning block 102, to set minimum values for the PWM duty cycle commands, as described in greater detail in the aforementioned U.S. Patent No. 5,606, 503. Control 110 is responsive to an enable signal on line 108 from a mode control apparatus 106 to enable the output of commands from block 110. The enable signal is generated by mode control apparatus 106 in response to an active ignition state signal on line 62. Without an enable signal on line 108, any commands determined will not be output on lines 112, 114, 116, 118 and 120 and the controller is allowed to enter a standard "sleep" state of the type used in automotive controllers when the vehicle ignition is off. An enable signal on line 108 does not force any output command levels, but simply enables output of the commands from block 110.

The resultant control outputs from block 110 are provided to an output interface 111 on lines 112, 114, 116 and 118 and comprise the duty cycle commands for the four actuators 12 in the suspension system. The damper low side control command is provided on line 120. The duty cycle commands on lines 112, 114, 116 and 118 are converted in a known manner to pulse width modulated signals having the duty cycles commanded by the signals on lines 112, 114, 116 and 118. Output interface 111 includes a PWM control comprising standard signal processing and power electronic circuitry, possibly including another microcomputer, such as a Motorola™ 68HC11 KA4, which is adapted for providing PWM output control commands. The interface between the microcomputer controller and the variable force dampers may include standard power electronic switches and protective circuitry as required for controlling current in a valve activating solenoid coil such as is shown in U.S. Pat. No. 5,282,645, issued Feb. 1, 1994. The valve responds to a pulse width modulated signal and provides a continuously variable range of decrease in flow restriction of a bypass passage to the reservoir of the damper between maximum restricted flow when the valve is closed in response to a 0% duty cycle command and a minimum restricted flow when the valve is open and responsive to 100% duty cycle command, or vice versa. Those skilled in the art will understand that any suitable microprocessor-based controller capable of providing the appropriate actuator command and performing the required control routine can be used in place of the example set forth herein and are equivalents thereof.

Figure 3:
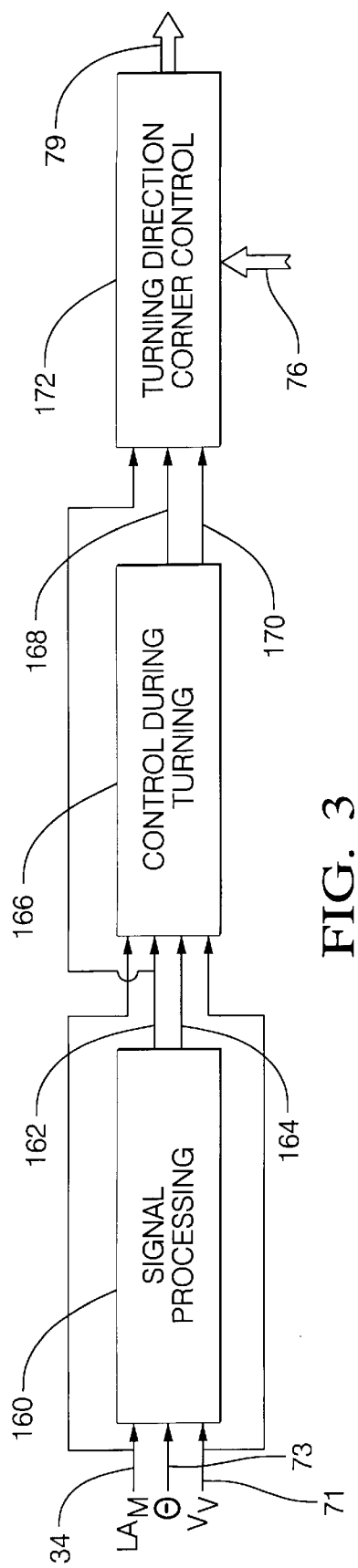
FIG. 3 illustrates a vehicle stability control for use in the suspension controller of FIG. 2.

Referring now to FIG. 3, a general block diagram of the vehicle stability control 75 is shown. Signal processing block 160 receives the measured lateral acceleration $LA_M$, the steering wheel angle θ and the vehicle speed signal $V_V$ on lines 34, 73 and 71, respectively. Block 160 uses these signals to determine a signal, DLA, on line 164 indicative of the rate of change in vehicle lateral acceleration and a combined lateral acceleration signal $LA_{CM}$ on line 162 that is the greater in magnitude of (a) measured lateral acceleration $LA_M$ and (b) computed lateral acceleration $LA_C$ and has the direction of measured lateral acceleration. Block 160 is described in more detail below with reference to FIG. 4.

Control During Turning block 166 responds to the signal DLA on line 164, as well as signal $LA_M$ on line 34 and the vehicle speed signal $V_V$ on line 71 to control the status of a flag on line 170 that indicates whether the vehicle is in a turning maneuver. Block 166 also determines a turning PWM command on line 168 responsive to the vehicle speed $V_V$ and combined lateral acceleration $LA_{CM}$ signals on lines 71 and 162, respectively. Block 166 is described in more detail below with reference to FIG. 5.

The signals on lines 168 and 170, along with the combined lateral acceleration signal on line 162 are provided to block 172, the turning direction corner control. Block 172 determines to which corners (e.g., front left, front right, rear left and rear right) the turning PWM command based on the combined lateral acceleration signal will be provided and whether such corners are in compression or rebound. Block 172 provides the resultant corner STAB PWM commands on bus 79. Block 172 is described in more detail below with reference to FIG. 6.

Figure 4:
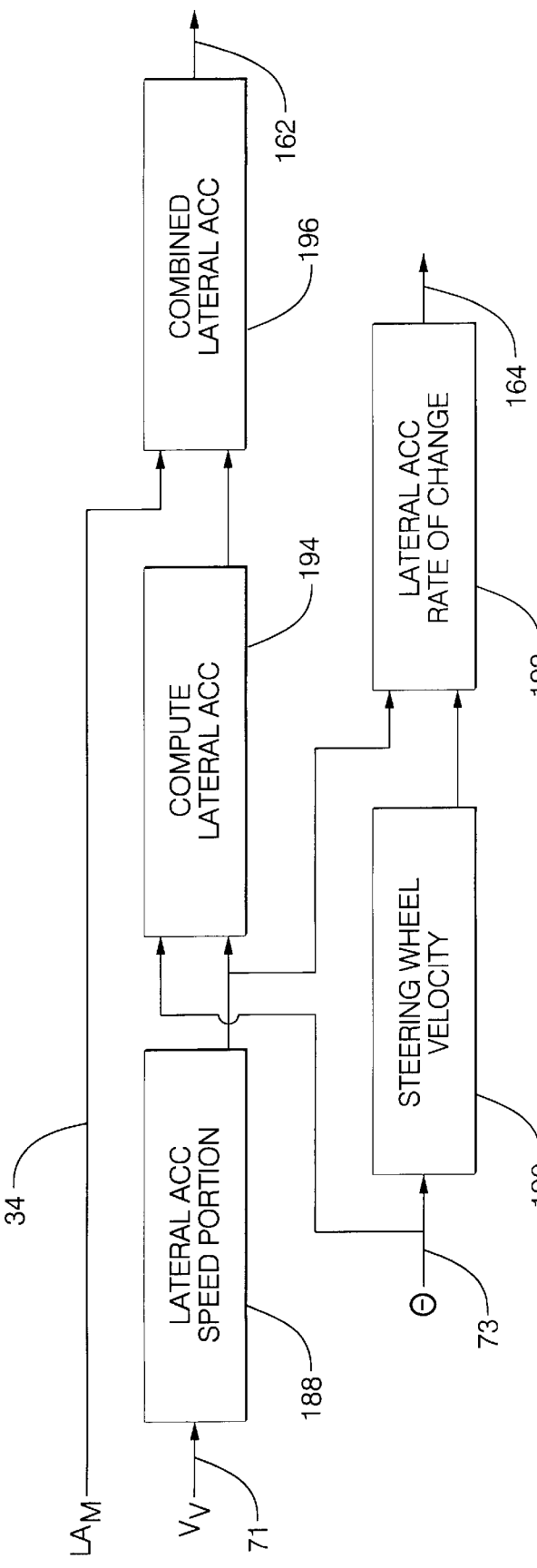
FIG. 4 illustrates a signal processing block for use in the vehicle stability control of FIG. 3.

Signal processing block is shown in more detail in FIG. 4. The steering wheel velocity $V_θ$ is determined at block 190 by differentiating the steering wheel angle signal on line 73. For example, a second order digital differentiating filter may be implemented according to the following function:

$$H(z)=g_1(1-z^{-1})/(1-c_1z^{-1}+c_2z^{-2}),$$

where $g_1$ is the filter gain and $c_1$ and $c_2$ are the filter coefficients selected to provide the desired differentiator operation at the applicable frequency and loop time. For example, at a one millisecond sampling interval (1 kHz sampling frequency) and loop time, the following coefficients may provide the desired response: $g_1=11.1$, $c_1=1.8705$ and $c_2=0.8816$. The system designer can adjust these factors to tune the phase and frequency response of the filter as desired. The steering wheel velocity signal determined by block 190 is provided to block 192, described below.

Block 188 performs a partial calculation of lateral acceleration based on vehicle speed LAVS, for example, according to:

$$LAVS=V_V^2/(g_{VS}V_V^2+g_{WB}),$$

where $V_V$ is the vehicle speed, $g_{VS}$ is the steering gear ratio times an understeer coefficient of the vehicle and $g_{WB}$ is the steering gear ratio times the vehicle wheel base. The signal LAVS is provided to blocks 192 and 194. Block 192 then determines the rate of change of lateral acceleration signal DLA according to:

$$DLA=|LAVS*V_θ|,$$

where $V_θ$ is the steering wheel velocity signal from block 190 and the vertical lines indicate the absolute value of the product. According to the above equation, DLA is directly proportional to steering wheel velocity and, if the steering wheel is not moving, i.e., $V_θ=0$, then DLA equals zero. The signal DLA is provided on line 164.

Block 194 computes the vehicle lateral acceleration, $LA_C$ as follows:

$$LA_C=LAVS*θ.$$

The computed lateral acceleration $LA_C$ is provided to block 196 along with the measured lateral acceleration signal $LA_M$ on line 34. Block 196 outputs a combined lateral acceleration signal $LA_{CM}$ on line 162 with a magnitude equal to the greater of the measured and computed lateral acceleration signal magnitudes but a direction always equal to the direction of the measured lateral acceleration signal. Thus the combined lateral acceleration signal has the advantage of fast response, since the computed value is derived from steering wheel velocity, which precedes the actual vehicle body acceleration, but is always referenced to the measured value for direction, since the steering angle can be momentarily incorrect for this purpose on low friction road surfaces.

Figure 7:
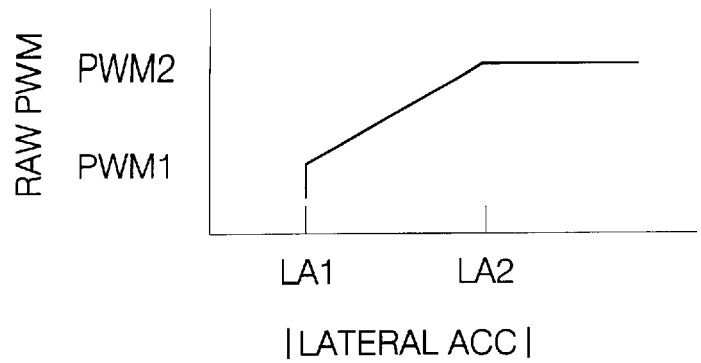
FIG. 7–9 show graphs illustrating aspects of the operation of the vehicle stability control of FIG. 3.
Figure 8:
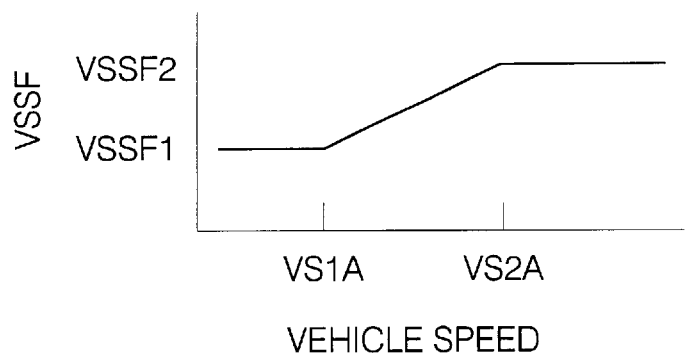

The control during turning block 166, shown in more detail in FIG. 5, has a raw PWM command generator block 208 that responds to the absolute value of the combined lateral acceleration signal on line 162 to derive a raw PWM command according to the function depicted, for example, in FIG. 7. The raw PWM is an inverse linear function between upper limit OSP1 and lower limit OSP2, corresponding to lateral acceleration values LA1 and LA2, respectively. A scale factor block 210 is responsive to vehicle speed to generate a scale factor as shown, for example, in FIG. 8. The vehicle speed scale factor VSSF is a direct linear function of vehicle speed between the limits VSSF2 and VSSF1, corresponding to vehicle speed values VS1A and VS2A, respectively. The raw PWM and vehicle speed scale factor are provided to scaled PWM command generator block 212, which derives the scaled PWM command by multiplying the raw PWM value from block 208 by scale factor VSSF from block 210. The product is limited to a predetermined maximum value and then provided on line 168.

Figure 9:
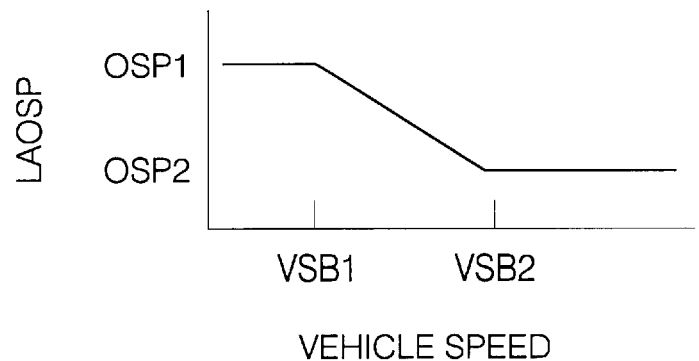

The vehicle speed signal on line 71 is provided to the switch point generator 218. Block 218 determines a first switch point LAOSP as a function of vehicle speed as shown, for example, in FIG. 9, wherein switch point LAOSP is an inverse linear function of vehicle speed between a maximum value OSP1 corresponding to vehicle speed VSB1 and a minimum value OSP2 corresponding to vehicle speed VSB2. A second switch point LAISP is derived as a scaled fraction of switch point LAOSP.

Figure 10:
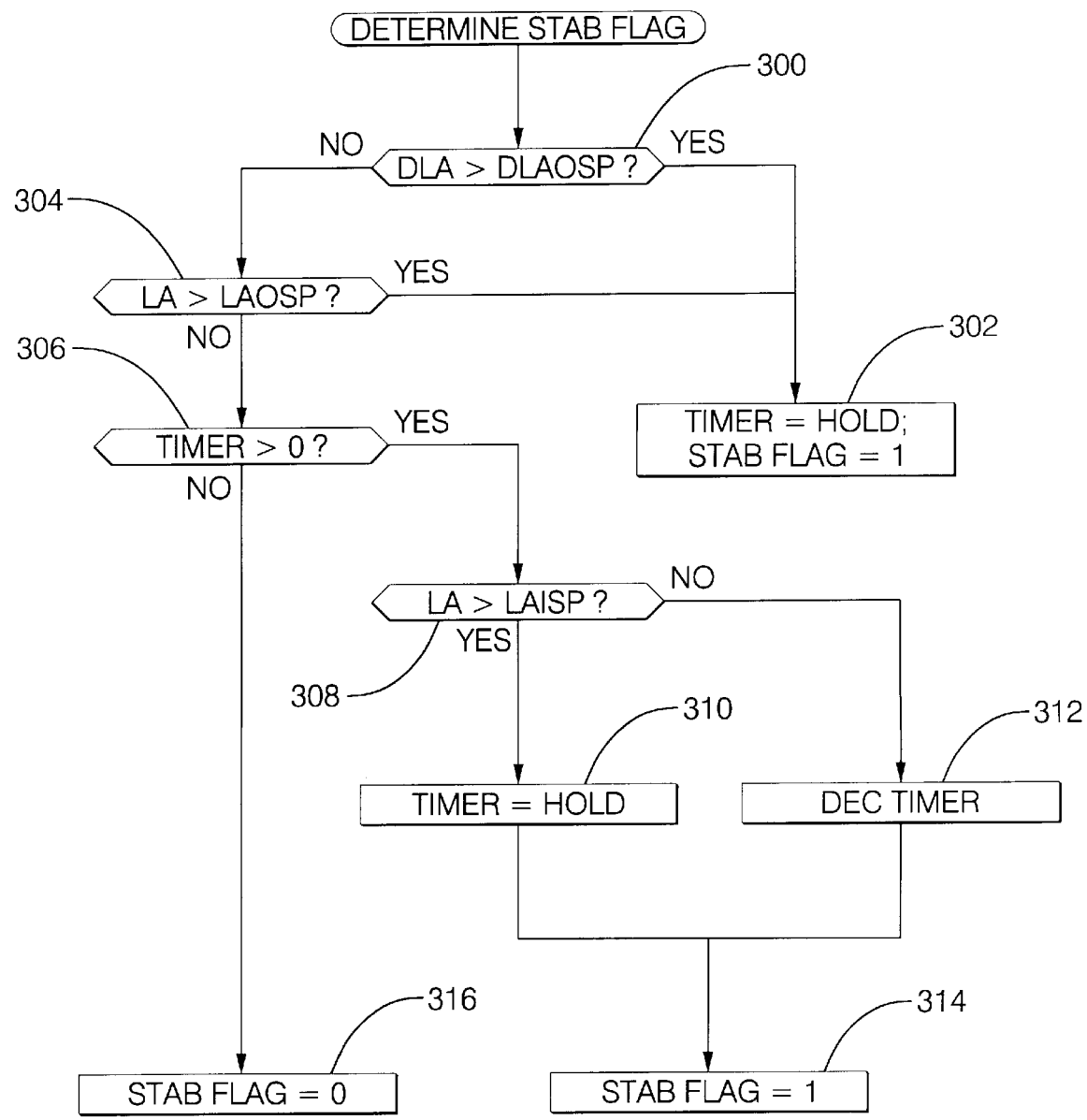
FIG. 10–13 show flow charts illustrating the operation of the vehicle stability control of FIG. 3.

Switch points LAOSP and LAISP are provided on lines 220 and 222, respectively, along with the measured lateral acceleration on line 34 and signal DLA on line 164, to event detector block 224. Block 224 provides a signal STAB FLAG on line 170 that indicates when the vehicle is in a turning maneuver and requires the stability enhancement. The STAB FLAG is determined as shown in the flow chart of FIG. 10. The subroutine first determines at 300 if DLA, the rate of change of lateral acceleration, exceeds a predetermined constant value DLAOSP. If it is, at 302 a timer is loaded with a predetermined time HOLD; and STAB FLAG is set to 1. If not, the subroutine determines at 304 if the measured lateral acceleration exceeds the value of LAOSP received from block 220. If so, the timer is loaded with HOLD and STAB FLAG is set to 1 at 302. If neither of the signals DLA or the measured lateral acceleration exceeds its switch point, the timer is checked at 306. If it is zero (expired), the STAB FLAG is set to 0 at 316. If it is greater than zero (unexpired), the measured lateral acceleration is compared at 308 to the smaller scaled value LAISP from block 220. If it exceeds LAISP, TIMER is set to HOLD at 310; if it does not, TIMER is decremented at 312. In either case, the STAB FLAG is set to 1 at 314.

Referring now to FIG. 6, the turning direction corner control block 172 includes a mask selector block 228, a table 226, a corner direction command generator 232 and an apply command generator 236. The mask selector block 228 receives the STAB FLAG on line 170 and combined lateral acceleration $LA_{CM}$ on line 162 and uses those signals to select which of two data masks stored in table 226 are used by block 232 as the selected data mask.

Each data mask is coded to define a unique relationship to the four corner suspensions for both compression and rebound modes, and the two data masks provide enhanced stability for turns in opposite directions. An example table stored in block 226 is as follows, wherein "1" indicates that stability enhancement is applied and "0" indicates it is not applied at the indicated corner and compression/rebound state:

|  | COMPRESSION | | | | REBOUND | | | |
| --- | --- | --- | --- | --- | --- | --- | --- | --- |
|  | LF (bit 7) | RF (bit 6) | LR (bit 5) | RR (bit 4) | LF (bit 3) | RF (bit 2) | LR (bit 1) | RR (bit 0) |
| STAB L MASK | 0 | 1 | 0 | 1 | 1 | 0 | 1 | 1 |
| STAB R MASK | 1 | 0 | 1 | 0 | 0 | 1 | 1 | 1 |

One of the stability data masks is chosen only when the stability flag indicates that stability enhancement is required:

STAB FLAG=1.

If the previous condition is not met, the data mask is set to all zeros. But if the condition is met, STAB R MASK is chosen if combined lateral acceleration is positive:

$LA_{CM}>0$.

Otherwise, STAB L MASK is chosen.

Figure 11:
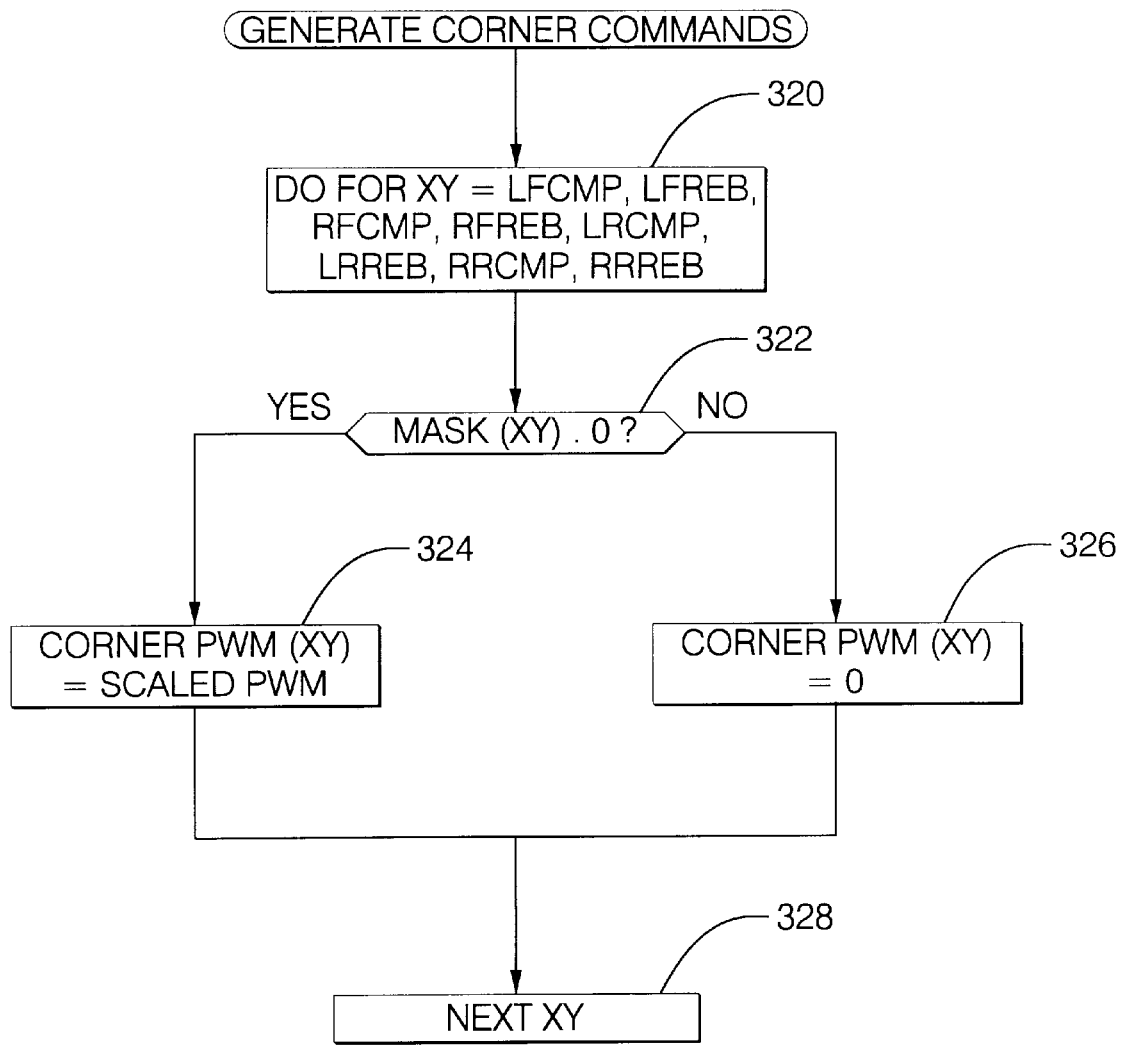

The chosen data mask is provided along with the value of SCALED PWM to corner direction command generator block 232, which determines and outputs corner PWM values for each of the four corners of the vehicle body in compression and rebound modes on bus 234. Essentially, corner direction command generator block 232 determines, as directed by the chosen mask from block 228, which corner(s) will receive the SCALED PWM command generated in block 212 in compression, in rebound or both. The operation of block 232 is described with reference to the flow chart of FIG. 11. Subroutine DETERMINE CORNER COMMANDS is a repetitive loop that is run eight times, once for each corner in each damper direction. At 320, the parameters of the loop are declared: DO for each value of bit XY of the stated mask, where the values of X indicate the four corners (LF, RF, LR, RR) and the values of Y indicate the compression/rebound state (CMP, REB), resulting in eight possible combinations. The loop begins by determining at 322 if the appropriate bit of the selected mask (STAB L MASK or STAB R MASK) is equal to 1. If so, it sets the corresponding value of CORNER PWM (XY) to the received value of SCALED PWM at 324; if not, it sets the corresponding value of CORNER PWM (XY) to zero at 326. The loop is then repeated for the next value of XY determined at 328. When the loop has completed its eight cycles, the result is an array of eight values of CORNER PWM (XY), one for each corner of the vehicle in each of the compression and rebound modes.

Figure 12:
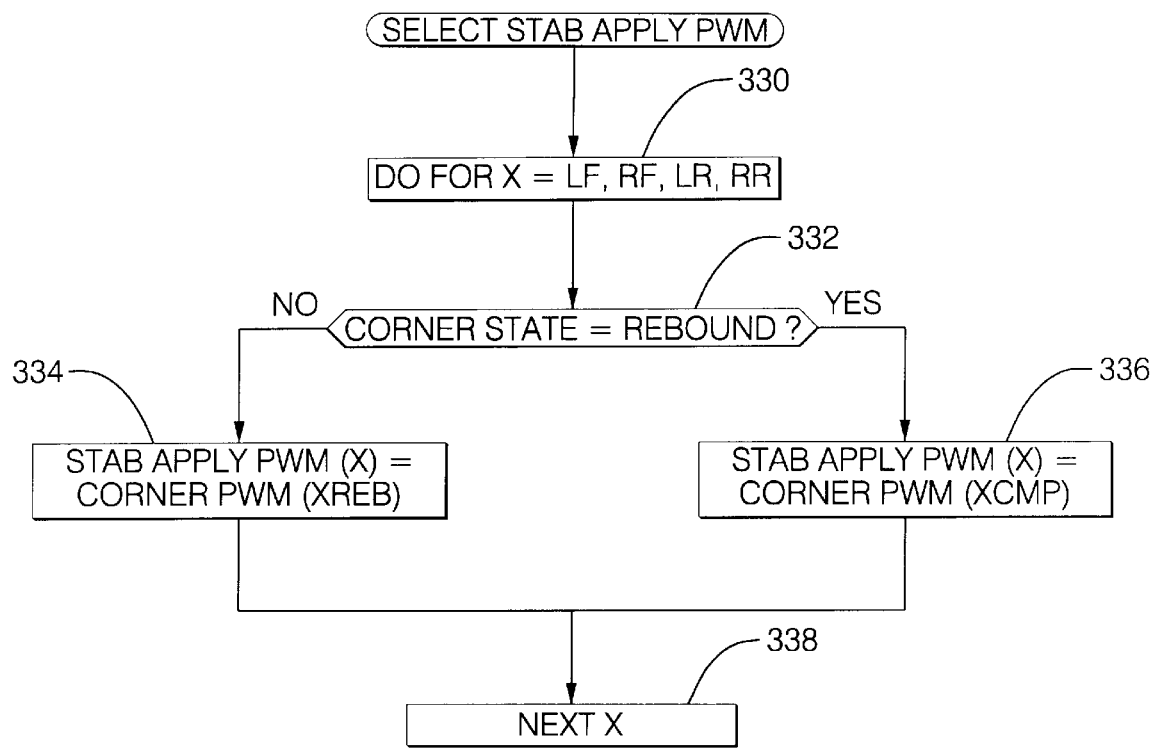

The eight corner direction commands CORNER PWM (XY) on bus 234 are provided along with the signals on bus 76 to the apply command generator block 236. Block 236 uses the high pass filtered relative velocity signals on bus 76 to determine whether each corner is in a compression or a rebound state and select the corresponding compression or rebound CORNER PWM (XY) command for that corner for the STAB APPLY PWM (X) commands on bus 79. With reference to the flow chart of FIG. 12, the process SELECT STAB APPLY PWM first declares parameters of a DO loop at 330 for the four corners: X=LF, RF, LR, RR. For each corner, the compression/rebound state of the damper is determined at 332 by examining the high pass filtered relative velocity signal for the corner. If that signal is greater than or equal to zero, indicating that the corner is in rebound, then Y=REB; and the rebound CORNER PWM (XREB) command for that corner is selected at 334 as the STAB APPLY PWM command for that corner on bus 79. Otherwise, Y=CMP; and the compression CORNER PWM (XCMP) command for that corner is selected at 336 as the corner STAB APPLY PWM command on bus 79. The next value of X is then chosen at 338 to repeat the loop, thus determining the corner STAB APPLY PWM commands for the left front, left rear and right rear corners for output on bus 79 in a similar manner.

Figure 13:
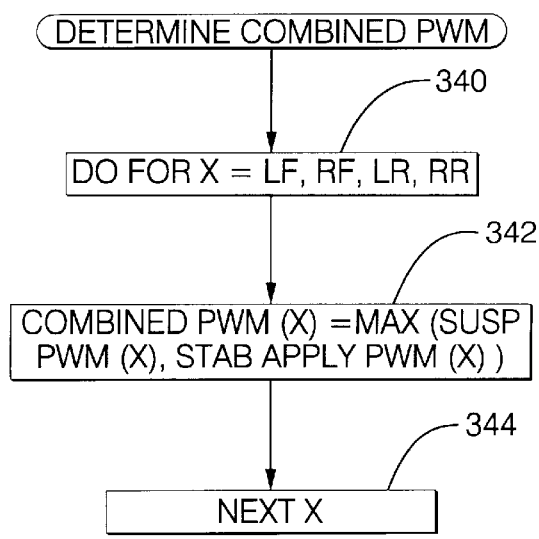

As previously stated, the STAB APPLY commands serve as minimum PWM values for each corner. This can be accomplished for each corner as shown in the flow chart of FIG. 13. The subroutine DETERMINE COMBINED PWM (X) proceeds at 340 in a DO loop for X=LF, RF, LR, RR. The maximum of STAB APPLY PWM (X) and SUSP PWM (X) is selected at 342 for the value of COMBINED PWM (X). The next value of X is then chosen at 344 until all four corners have determined values of COMBINED PWM (X). It may be noted that the previously mentioned U.S. Pat. No. 5,606,503, which describes automatic control algorithm 82 in greater detail, shows a process block 220 titled "automatic mode PWM duty cycle floor," which provides an opportunity to set a minimum PWM value for each corner. That block could be modified to receive the STAB APPLY PWM commands from vehicle stability control 75 in this apparatus and determine the maximum of the values at each corner as described above, as an alternative to performing the same function in environmental compensation block 92 as described herein.

This invention is also applicable to suspension systems using bi-state, real time controlled dampers. Such dampers differ from the continuously variable dampers used in the preferred embodiment described above in that, although they can be switched between two different valve conditions (low damping or high damping, as by opening or closing a bypass valve that supplements the main damper valving) sufficiently fast for real time suspension control, they cannot be switched sufficiently fast for pulse width modulated continuously variable valving. With no pulse width modulation possible, there is no point in deriving a PWM value. Blocks 208, 210 and 212 of FIG. 5 and block 232 of FIG. 6 can be eliminated from the control. The data mask is selected in mask detector 228 in response to the stability flag from event detector 224, which determines when stability control is required, and a vehicle lateral acceleration indicating signal, which determines which side of the vehicle will be controlled in compression and which in rebound. The selected data mask is provided directly to apply command generator 236.

The vehicle lateral acceleration indicating signal used in the bi-state damper system is preferably the measured lateral acceleration $LA_M$, since it always indicates the most accurate direction of vehicle lateral acceleration. But the vehicle steering angle signal could alternatively be used, since it will indicate the direction of vehicle lateral acceleration in all but extreme vehicle handling situations. Of course, if either is available, the combined lateral acceleration or the calculated lateral acceleration could be used, with the former providing the same indicated direction of vehicle lateral acceleration as the measured lateral acceleration and the latter providing the same direction as the calculated lateral acceleration. Similarly, in the system described above in detail for continuously variable dampers, the calculated lateral acceleration, though not preferred, could serve as a substitute for combined lateral acceleration if a lateral acceleration sensor was not available.

Through the use of the mask data elements the controller controls the left and right suspensions during extended turning maneuvers. The purpose is not to control vehicle roll during turning, which is best handled by a faster acting transient roll control that responds to steering wheel motion and prevents roll from occurring. Rather, the control of this invention is intended to provide vehicle handling stability during an extended turn, such as the steady turn required on a highway entrance or exit ramp or a long turn in a road. The purpose is to help the vehicle tires maintain contact with the road entirely through the turn. The dampers are stiffened in compression on the outside of the turning vehicle to keep the wheels from bouncing up, off the road; and the dampers are stiffened in rebound on the inside of the turning vehicle for the same reason.

A basic difference should be noted in the application of damping commands by vehicle stability control 75 of this invention and the prior art semi-active suspension control described as automatic control algorithm 82. The prior art system modified by this invention applies damping in the classic semi-active "sky hook" manner. The control is primarily body control oriented for occupant comfort; and damping is increased only when so doing would provide a force on the body in the correct direction to retard vertical movement of the body. This is determined by comparing the vertical direction of demand force with the direction of the damper (compression or rebound), as described in the referenced U.S. Pat. No. 5,606,503 with reference to the quadrant power check of block 316 in that patent. When demand force on the body results from upward body movement and the damper is in a rebound state (extension), the demand force can be applied by a damper (by resisting extension, the damper is able to resist upward body movement). This is also true when demand force results from downward movement of the body and the damper is in a compression state. Thus, the demand force command is provided to each damper only in the two quadrants wherein the direction of demand force (or body movement) matches the damper state. In the other two quadrants, the damper is not activated.

In contrast, the goal of the control of this invention is primarily vehicle handling; and the damping commands produced by vehicle stability control 75 of this invention are applied in response to the compression/rebound state of the damper as mapped by the data mask, without regard to the direction of demand force or vertical body motion. Thus, the damping commands for a corner produced by the two controls are determined independently of each other and will not always provide zero and non-zero values simultaneously. This is expected, since the objectives of the two controls are different.

What is claimed is:

1. A method of controlling suspension dampers at the four corners of the body of a motor vehicle having steering apparatus and further having a wheel coupled to each of the suspension dampers, the method comprising the steps:

determining a relative velocity of each of the suspension dampers and deriving from the determined relative velocities a demand force command for each of the dampers;

applying each of the derived demand force commands to its respective damper if and only if when a comparison of the direction of the demand force command with the sensed relative velocity of the damper indicates that a force corresponding to the demand force command can be effectively exerted by the damper;

sensing a vehicle lateral acceleration indicating parameter;

responsive to the sensed vehicle lateral acceleration indicating parameter, determining a stability compression damping command for the suspension dampers on the side of the vehicle opposite the direction of indicated vehicle lateral acceleration and a stability rebound damping command for the suspension dampers on the side of the vehicle in the direction of indicated vehicle lateral acceleration;

while the vehicle lateral acceleration indicating parameter is sensed, applying the stability compression damping command to the suspension dampers on the side of the vehicle opposite the direction of indicated vehicle lateral acceleration and the stability rebound damping command to the suspension dampers on the side of the vehicle in the direction of indicated vehicle lateral acceleration, without regard for the direction of demand force for any of the suspension dampers.

2. A method according to claim 1 wherein the vehicle lateral acceleration indicating parameter is a measured lateral acceleration.

3. The method of controlling suspension dampers of claim 2 further comprising:

sensing a steering angle of the steering apparatus;

sensing a vehicle speed;

deriving a calculated lateral acceleration value from the sensed steering angle of the steering apparatus and the sensed vehicle speed;

deriving a combined lateral acceleration value having a magnitude component derived from the larger magnitude of the measured lateral acceleration and the calculated lateral acceleration value and having a direction component the same as that of the measured lateral acceleration; and deriving at least one of the stability compression damping command and the stability rebound damping command from the derived combined lateral acceleration value.

4. A method according to claim 1 wherein the vehicle lateral acceleration indicating parameter is a steering angle of the steering apparatus.

5. A suspension control for a vehicle body having steering apparatus and a suspension system having suspension dampers at the four corners of the body and a wheel coupled to each of the suspension dampers, the control comprising:

means for determining a relative velocity of each of the suspension dampers and deriving from the determined relative velocities a demand force command for each of the dampers;

means for applying each of the derived demand force commands to its respective damper if and only if a comparison of the direction of the demand force command with the sensed relative velocity of the damper indicates that a force corresponding to the demand force command can be effectively exerted by the damper;

means for sensing a vehicle lateral acceleration indicating parameter;

means for determining a stability compression damping command for the suspension dampers on the side of the vehicle opposite the direction of indicated vehicle lateral acceleration and a stability rebound damping command for the suspension dampers on the side of the vehicle in the direction of indicated vehicle lateral acceleration; and means effective, while the lateral acceleration is sensed, for applying the stability compression damping command to the suspension dampers on the side of the vehicle opposite the direction of indicated vehicle lateral acceleration and the stability rebound damping command to the suspension dampers on the side of the vehicle in the direction of indicated vehicle lateral acceleration, without regard for the direction of demand force for any of the suspension dampers.

6. A suspension control according to claim 5 wherein the means for sensing a vehicle lateral acceleration indicating parameter is a lateral acceleration sensor providing a measured lateral acceleration signal.

7. A suspension control according to of claim 6 further comprising:

a steering angle sensor providing a steering angle signal;

a vehicle speed sensor providing a vehicle speed signal;

means for deriving a calculated lateral acceleration value from the steering angle signal and the vehicle speed signal;

means for deriving a combined lateral acceleration value having a magnitude component derived from the larger magnitude of the measured lateral acceleration and the calculated lateral acceleration value and having a direction component the same as that of the measured lateral acceleration; and deriving at least one of the stability compression damping command and the stability rebound damping command from the combined lateral acceleration value.

8. A suspension control according to claim 5 wherein the means for sensing a vehicle lateral acceleration indicating parameter is a steering angle sensor providing a steering angle signal.

9. A method of controlling suspension dampers at the four corners of the body of a motor vehicle having steering apparatus and further having a wheel coupled to each of the suspension dampers, the method comprising the steps:

determining a relative velocity of each of the suspension dampers and deriving from the determined relative velocities a demand force command for each of the dampers;

applying each of the derived demand force commands to its respective damper if and only if a comparison of the direction of the demand force command with the sensed relative velocity of the damper indicates that a force corresponding to the demand force command can be effectively exerted by the damper;

sensing a direction and a magnitude of vehicle lateral acceleration;

sensing a steering angle of the steering apparatus;

sensing a vehicle speed;

from the sensed steering angle of the steering apparatus and sensed vehicle speed, deriving an estimated vehicle lateral acceleration magnitude;

responsive to the larger of the estimated vehicle lateral acceleration magnitude and the sensed magnitude of vehicle lateral acceleration, determining a stability compression damping command for the suspension dampers on the side of the vehicle opposite the sensed direction of vehicle lateral acceleration and a stability rebound damping command for the suspension dampers on the side of the vehicle in the sensed direction of vehicle lateral acceleration; and applying the stability compression damping command to the suspension dampers on the side of the vehicle opposite the sensed direction of vehicle lateral acceleration and the stability rebound damping command to the suspension dampers on the side of the vehicle in the sensed direction of vehicle lateral acceleration, without regard for the direction of demand force for any of the suspension dampers.

10. A method of controlling suspension dampers at the four corners of the body of a motor vehicle having steering apparatus and further having a wheel coupled to each of the suspension dampers, the method comprising the steps:

determining a relative velocity of each of the suspension dampers and deriving from the determined relative velocities a demand force command for each of the dampers;

applying each of the derived demand force commands to its respective damper if and only if a comparison of the direction of the demand force command with the sensed relative velocity of the damper indicates that a force corresponding to the demand force command can be effectively exerted by the damper;

sensing a vehicle lateral acceleration indicating parameter;

deriving a direction of vehicle lateral acceleration from the sensed vehicle lateral acceleration indicating parameter;

determining a stability compression damping command for the suspension dampers on the side of the vehicle opposite the direction of vehicle lateral acceleration and a stability rebound damping command for the suspension dampers on the side of the vehicle in the direction of vehicle lateral acceleration; and applying the stability compression damping command to the suspension dampers on the side of the vehicle opposite the direction of vehicle lateral acceleration and the stability rebound damping command to the suspension dampers on the side of the vehicle in the direction of vehicle lateral acceleration, without regard for the direction of demand force for any of the suspension dampers.

11. A method according to claim 10 wherein the vehicle lateral acceleration indicating parameter is a measured lateral acceleration.

12. A method according to claim 10 wherein the vehicle lateral acceleration indicating parameter is a steering angle of the steering apparatus.

* * * * *